(12) United States Patent
Koseoglu

(10) Patent No.: US 10,669,485 B2
(45) Date of Patent: Jun. 2, 2020

(54) INTEGRATED PROCESS FOR PRODUCING ANODE GRADE COKE

(71) Applicant: SAUDI ARABIAN OIL COMPANY, Dhahran (SA)

(72) Inventor: Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 198 days.

(21) Appl. No.: 15/877,878

(22) Filed: Jan. 23, 2018

(65) Prior Publication Data

US 2018/0148651 A1    May 31, 2018

Related U.S. Application Data

(62) Division of application No. 15/219,730, filed on Jul. 26, 2016, now Pat. No. 9,909,068.

(60) Provisional application No. 62/200,830, filed on Aug. 4, 2015.

(51) Int. Cl.

| | |
|---|---|
| *C10B 57/04* | (2006.01) |
| *C10G 67/04* | (2006.01) |
| *C10G 67/14* | (2006.01) |
| *C10J 3/00* | (2006.01) |
| *C10B 55/00* | (2006.01) |
| *C10G 9/00* | (2006.01) |
| *C10G 25/00* | (2006.01) |
| *C10G 45/02* | (2006.01) |
| *C10G 47/20* | (2006.01) |
| *C10G 49/00* | (2006.01) |
| *C10G 67/06* | (2006.01) |
| *C10G 21/00* | (2006.01) |

(52) U.S. Cl.
CPC .......... *C10B 57/045* (2013.01); *C10B 55/00* (2013.01); *C10G 9/005* (2013.01); *C10G 21/003* (2013.01); *C10G 25/00* (2013.01); *C10G 45/02* (2013.01); *C10G 47/20* (2013.01); *C10G 49/007* (2013.01); *C10G 67/049* (2013.01); *C10G 67/0463* (2013.01); *C10G 67/06* (2013.01); *C10G 67/14* (2013.01); *C10J 3/00* (2013.01); *C10G 2300/1033* (2013.01); *C10G 2300/1055* (2013.01); *C10G 2300/202* (2013.01); *Y02P 20/125* (2015.11)

(58) Field of Classification Search
CPC .................................................. C10G 67/049
See application file for complete search history.

(56) References Cited

U.S. PATENT DOCUMENTS

| | | | | |
|---|---|---|---|---|
| 3,542,532 A | * | 11/1970 | Johnson | C10J 3/482 48/202 |
| 5,124,025 A | | 6/1992 | Kolstad et al. | |
| 6,332,975 B1 | * | 12/2001 | Abdel-Halim | C10G 55/04 208/131 |
| 7,381,320 B2 | | 6/2008 | Iqbal et al. | |
| 2009/0134059 A1 | | 5/2009 | Myers et al. | |
| 2009/0283443 A1 | * | 11/2009 | Kuroda | B01J 29/89 208/111.1 |
| 2013/0319910 A1 | * | 12/2013 | Koseoglu | C10G 67/0463 208/86 |

OTHER PUBLICATIONS

Jesus Alirio Carrillo, et al., "Heavy Crude Oil Upgrading: Jazmin Crude," Adv. Chem. Eng. and Sci., 3:46-55 (2013).
Gunter Alfke, et al., "Oil Refining. Residue Conversion Processes," Ullmann's Encyclopedia of Industrial Chemistry pp. 231-240 (Jan. 15, 2007).

* cited by examiner

*Primary Examiner* — Randy Boyer
(74) *Attorney, Agent, or Firm* — Abelman, Frayne & Schwab

(57) ABSTRACT

The invention relates to processes for producing anode grade coke from whole crude oil. The invention is accomplished by first deasphalting a feedstock, followed by processing resulting DAO and asphalt fractions. The DAO fraction is hydrotreated or hydrocracked, resulting in removal of sulfur and hydrocarbons, which boil at temperatures over 370° C., and gasifying the asphalt portion in one embodiment. This embodiment includes subjecting hydrotreated and/or unconverted DAO fractions to delayed coking. In an alternate embodiment, rather than gasifying the asphalt portion, it is subjected to delayed coking in a separate reaction chamber. Any coke produced via delayed coking can be gasified.

22 Claims, 2 Drawing Sheets

INTEGRATED PROCESS FOR PRODUCING ANODE GRADE COKE

RELATED APPLICATION

This application is a divisional of application Ser. No. 15/219,730 filed Jul. 26, 2016, which claims priority from U.S. Provisional Application No. 62/200,830 filed Aug. 4, 2015, both incorporated by reference in their its entirety.

FIELD OF THE INVENTION

The invention relates to an integrated process for treating whole crude oil to remove asphalt and other impurities therefrom, and then produce anode grade coke from the treated crude oil. To elaborate, the integrated process comprises the steps of separating asphalt from the whole crude oil, followed by treating the deasphalted oil ("DAO") via hydrotreatment/hydrocracking with a catalyst, to remove materials such as sulfur and nitrogen. The hydrotreated or unconverted DAO fraction is then subjected to delayed coking. In parallel, the recovered, asphalt containing fraction can be gasified, to produce hydrogen that is then used in the hydrocracking step.

BACKGROUND AND PRIOR ART

Conventional processes for treating crude oil involve distillation, and then various cracking, solvent refining, and hydroconversion processes, so as to produce a desired group of products, such as fuels, lubricating oil products, petrochemicals, chemical feedstocks, and the like. An exemplary process includes the distillation of the crude oil in an appropriate atmospheric distillation column, resulting in gas oil, naphtha, other gases, and atmospheric residuum. This last portion is fractionated further in a vacuum distillation column, so as to produce so-called vacuum gas oil, and vacuum residuum. The vacuum gas oil, in turn, is usually cracked via fluid catalytic cracking or hydrocracking, to produce more valuable light transportation fuel products, while the residuum can be processed further, to yield additional useful products. The methods involved in these processes can include, e.g., hydrotreating or fluid catalytic cracking of the residuum, coking, and solvent deasphalting. Any materials recovered from crude distillation at fuel boiling points have typically been used, directly, as fuels.

To elaborate on the processes described, supra, solvent deasphalting is a physical, separation process, where feed components are recovered in their original states, i.e., they do not undergo chemical reactions. Generally, a paraffinic solvent, containing 3-7 or 8 carbon molecules, is used to separate the components of the heavy crude oil fractions. It is a flexible process, which essentially separates atmospheric, and vacuum heavy residues, typically into two products: (i) asphalt and (ii) deasphalted or demetallized oil, referred to as "DAO" or "DMO," respectively hereafter. The choice of solvent is left to the skilled artisan, and is chosen with desired products, yields, and quantities in mind, as are other process parameters, such as the operating temperature, operating pressure, and the solvent/oil ratio. As a general rule, as the molecular weight of the solvent increases, so does solubility of the oil into the solvent. For example, either propane or a propane/isobutane mixture is typically used to manufacture lube oil bright stock. If, on the other hand, the DAO will be used in conversion practices, like fluid catalytic cracking, solvents with higher molecular weights (e.g., butane or pentane, or mixtures thereof), are used. The products of DAO solvation include those described supra, as well as lube hydrocracking feed, fuels, hydrocracker feed, fluid catalytic cracking feed, and fuel oil blends. The asphalt product may be used as a blending component for various grades of asphalt, as a fuel oil blending component, or as a feedstock for heavy oil conversion units (e.g., cokers.)

Conventional solvent deasphalting methods are carried out without catalysts or adsorbents. U.S. Pat. No. 7,566,394, the disclosure of which is incorporated by reference, teaches improved solvent deasphalting methods which employ solid adsorbents. The improvement in the methodology leads to separation of nitrogen and polynuclear aromatics from DAO. The adsorbents are then removed with the asphalt products, and are either sent to an asphalt pool, or gasified in a membrane wall gasifier, where solids are required.

Hydrocracking processes, as is well known, are used commercially in many refineries. A typical application of a hydrocracking process involves processing feedstreams which boil at 370° C. to 565° C. in conventional units, and those which boil at 520° C. and above, in so-called "residue units." Simply stated, hydrocracking is a process by which C—C bonds of large molecules in a feedstream, are broken, to form smaller molecules, which have higher volatility and economic value. In addition, hydrocracking processes typically improve the quality of hydrocarbon feedstock, by increasing the H/C ratio via hydrogenation of aromatic compounds, and by removing organo-sulfur, and organic nitrogen compounds.

Given the significant economic benefits that result from hydrocracking, it is not surprising that there have been substantial developments in improving hydrocracking processes, and the development of more active catalysts.

In practice, hydrocracking units usually include two principal zones: a reaction zone and a separation zone. There are also three standard configurations: single stage, series-flow ("once-through"), with and without recycling, and two stage processes, with recycling. The choice of reaction zone configuration depends upon various parameters, such as feedstock quality, the product specification and processing objectives, and catalyst selection.

Single stage, once-through hydrocracking processes are carried out at operating conditions which are more severe than typical hydrotreating processes, but which are less severe than conventional full pressure hydrocracking processes. Mild hydrocracking is more cost effective than more severe processes but, generally, it results in production of lesser amounts of desired middle distillate products, which are of lower quality than the products of conventional hydrocracking.

Single or multiple catalyst systems can be used depending upon, e.g., the feedstock processed and product specifications. Single stage hydrocracking units are generally the simplest configuration, designed to maximize middle distillate yield over a single or dual catalyst system. Dual catalyst systems are used in stacked-bed configurations or in two different reactors.

Feedstock is typically refined over one or more amorphous-based hydrotreating catalysts, either in the first catalytic zone in a single reactor, or in the first reactor of a two-reactor system. The effluents of the first stage are then passed to the second catalyst system which consists of an amorphous-based catalyst or zeolite catalyst having hydrogenation and/or hydrocracking functions, either in the bottom of a single reactor or the second reactor of a two-reactor system.

In two-stage configurations, which can also be operated in a "recycle-to-extinction" mode of operation, the feedstock is refined by passing it over a hydrotreating catalyst bed in the first reactor. The effluents, together with the second stage effluents, are passed to a fractionator column to separate the $H_2S$, $NH_3$, light gases ($C_1$-$C_4$), naphtha and diesel products which boil at a temperature range of 36-370° C. The unconverted bottoms, free of $H_2S$, $NH_3$, etc. are sent to the second stage for complete conversion. The hydrocarbons boiling above 370° C. are then recycled to the first stage reactor or the second stage reactor.

Hydrocracking unit effluents are sent to a distillation column to fractionate the naphtha, jet fuel/kerosene, diesel, and unconverted products which boil in the nominal ranges of 36-180° C., 180-240° C., 240-370° C. and above 370° C., respectively. The hydrocracked jet fuel/kerosene products (i.e., smoke point >25 mm) and diesel products (i.e., cetane number >52) are of high quality and well above worldwide transportation fuel specifications. While hydrocracking unit effluents generally have low aromaticity, any aromatics that remain will lower the key indicative properties of smoke point and cetane numbers for these products.

One major technical challenge posed in hydrotreating and/or hydrocracking heavy oil fractions or whole crude is the effect of small concentrations of contaminants, such as organic nickel or vanadium containing compounds, as well as poly nuclear aromatic compounds. These organometallic compounds, and others, reduce the activity or lifetime of hydrotreating catalysts. The contaminants and polynuclear aromatics cause reduced process performance, a need for increased capital, and higher operating costs for refinery processing units. The metals in the residual fraction of the crude oil deposit on the hydroprocessing catalyst pores and results in catalyst deactivation. These problems are addressed and solved in the disclosure which follows.

Conventional, prior art processes in the field of the invention involve distillation of crude oil, followed by treatment of the light fractions (naptha and diesel fuel) which remain following distillation. These light fractions are desulfurized and/or treated (i.e., "reforming" in the case of naphtha) to improve their quality, and are then sent to fuel pools for further use. The vacuum residium, referred to supra, is treated via solvent deasphalting, so as to secure deasphalted oil and asphalt. Asphalt is then further treated, by being gasified, or it is sent to the "asphalt pool."

Prior art processes show the treatment of fractionates or distillates of crude oil, rather than treatment of crude oil per se, as in accordance with the invention. See, e.g., PCT/EP2008/005210 where distillates are used to produce asphaltenes and DAO; U.S. Pat. No. 3,902,991, wherein a vacuum residuum is solvent extracted followed by hydrocracking and gasification of the DAO and asphalt; published U.S. Patent Application 2011/0198266, showing treatment of a vacuum residue; published U.S. Patent Application 2008/0223754, where residues from a distillation process are used to manufacture asphaltene and DAO; and EP 683 218, which also teaches treating residual hydrocarbon products. Also see, e.g., U.S. Pat. Nos. 8,110,090; 7,347,051; 6,357,526; 6,241,874; 5,958,365; 5,384,297; 4,938,682; 4,039,429; and 2,940,920, as well as Published U.S. Patent Application 2006/0272983; PCT/KR2010/007651, European Patent Application 99 141; and Published Japanese Patent Application 8-231965. All references discussed herein are incorporated by reference in their entirety.

The current invention simplifies and improves the prior art process, by eliminating the need for distillation, and for treating the naptha and diesel fractions. Rather, the invention, as will be seen, simplifies whole crude oil processing by hydrocracking the whole stream, and eliminating the steps referred to supra, while providing a method for delayed coking of fractions produced by the method.

How the invention is achieved will be seen in the disclosure which follows.

DETAILED DESCRIPTION OF PREFERRED EMBODIMENTS

Figure 1:
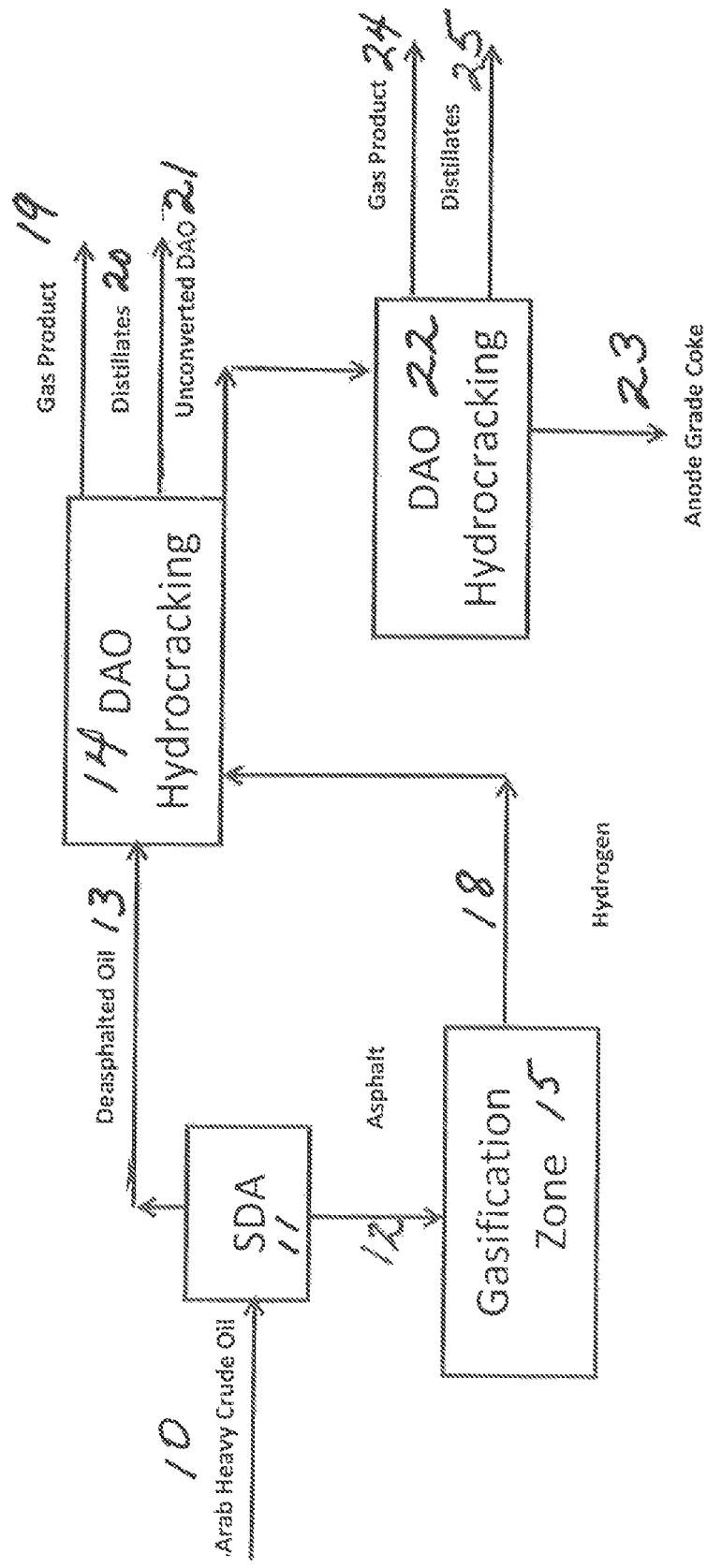
FIG. 1 shows a schematic depiction of the process of the invention, using a single reactor embodiment to reduce hydrocarbon containing feedstock.
Figure 2:
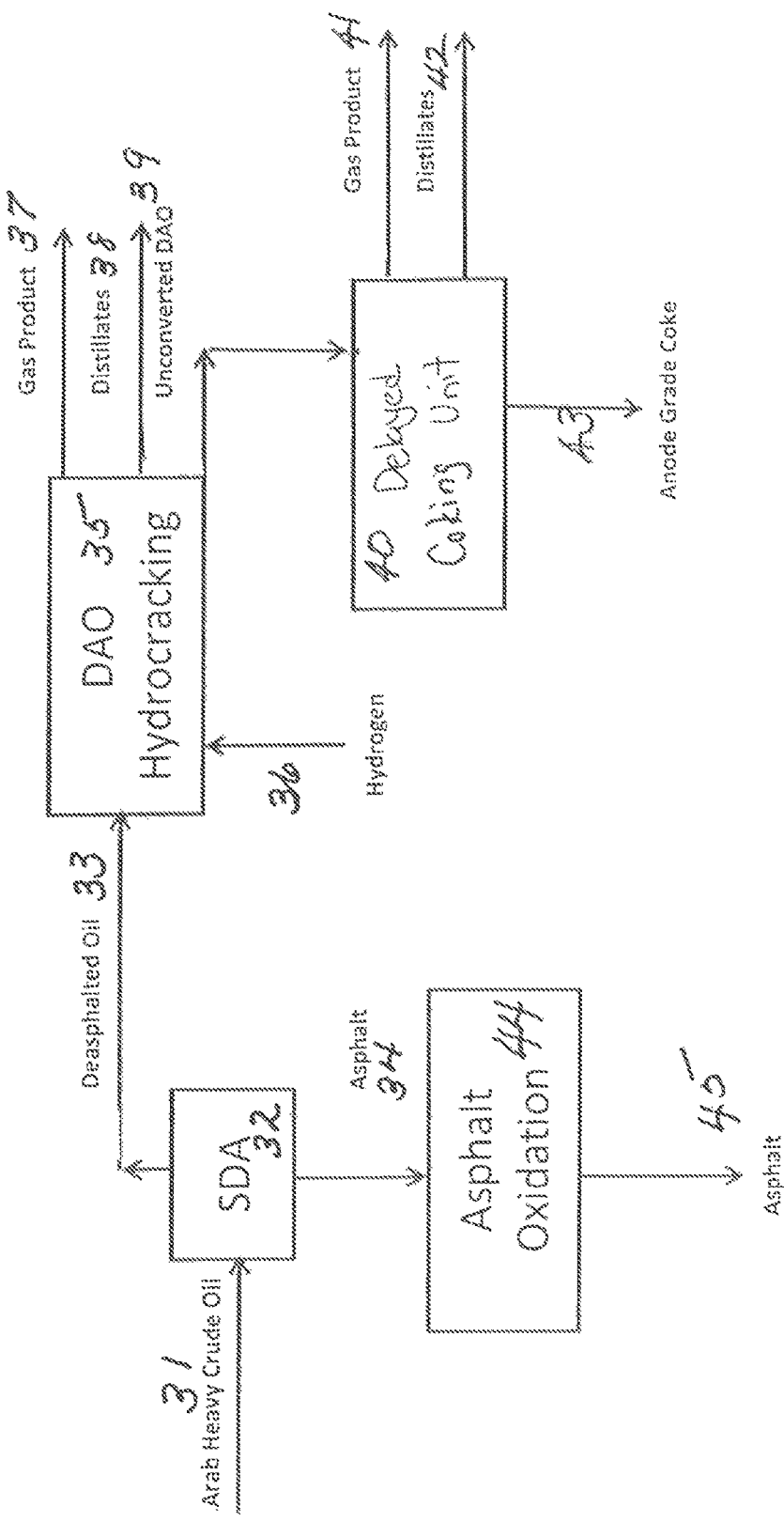
FIG. 2 shows an embodiment of the invention.

The invention may be best understood by referring to FIGS. 1 and 2, which illustrates the general method of the invention as well as a system used in its practice.

Referring to FIG. 1, a feedstream of crude oil "10" is added to a reaction chamber "11," so as to solvent deasphaltize (SDA) it, thereby producing an asphalt fraction "12," and a fraction of deasphalted oil, or "DAO 13" as referred to supra. The manner in which this fractionation can be accomplished is described, supra, i.e., a paraffinic solvent containing one or more carbon atoms containing from 3-8, more preferably 3-7 carbons, is used. No catalyst or adsorbent is necessary; however, see U.S. Pat. No. 7,566,394, incorporated by reference, supra, teaching an improved deasphalting process using a sorbent. No distillation is used, nor are the light components separated.

The "DAO" "13" is transferred to a hydrocracking/hydrotreating zone "14." It is to be understood that, while FIG. 1 describes a single reactor, the various methods for hydrocracking, including "once through, series flow," and "two-stage" reactions, may all be used. The reactor contains one or more catalysts which remove heteroatoms, such as sulfur and nitrogen from the DAO. Such catalysts are well known to the art, and are not repeated herein. Exemplary of such are catalysts described in, e.g., PCT/US11/46272 filed Aug. 2, 2011 and incorporated by reference herein. The cracking reaction takes place in the presence of hydrogen, which is supplied as explained infra.

It will be recalled that in addition to the DAO, solvent deasphalting of the crude oil produces an asphalt fraction "12." This asphalt fraction is transferred to a gasification chamber "15," together with oxygen and steam, which are not shown. These components, i.e., the oxygen and steam, may be supplied in pure form, or via, e.g., atmospheric air. The asphalt, oxygen and steam are combined, at temperatures and pressures which result in production of hydrogen. In the depicted embodiment, this hydrogen "18," is channeled to the DAO hydrocracking unit "14," to supply the hydrogen necessary for the hydrocracking process to take place. (It should be noted that the gasification of asphalt is an optional step, and may be replaced via, e.g., supplying an independent source of hydrogen). Various products, e.g., gases 19, and upgraded crude oil (distillates) 20, result, as well as unconverted DAO 21. This unconverted DAO is transmitted to a delayed coking chamber 22, and converted to anode grade coke 23, gases 24, and further distillates 25.

Turning to FIG. 2, as with FIG. 1, a source of crude oil 31 is provided to a solvent deasphalting unit 32. Following standard methods, deasphalted oil ("DAO") 33, and asphalt 34 are produced. The DAO is transmitted to a hydrocracking or hydrotreating chamber 35, supplied with hydrogen 36, which can be provided as per the description supra. The products of standard hydrocracking are gases 37, distillates 38, and unconverted DAO 39, which moves to a delayed coking unit 40, where it is processed to gases 41, distillates 42, and anode grade coke 43.

Further processing of asphalt 34 takes place in a further chamber an asphalt oxidation chamber 44, where the asphalt can be oxidized with, e.g., air to produce higher grade asphalt, or it too may be subjected to delayed coking to produce fuel grade coke. The asphalt 45 can be sent to an asphalt pool.

By separating the asphalt component of the crude oil from the DAO, one eliminates problems such as the failing of catalysts by metals that are present in the asphalt fraction. Catalyst life cycles are increased, and the need for shut downs of reactors, and replacement of materials, are decreased.

In the process as described herein, the hydrocracking process takes place at standard hydrocracking conditions, i.e., pressures ranging from about 100 to about 200 bars, temperatures ranging from about 350° C. to about 450° C., LHSVs of between 0.1 and 4.0 $h^{-1}$, and hydrogen oil ratios of from about 500 to about 2,500 SLt/Lt.

Following this step, any hydrotreated, or unconverted DAO fraction moves to a third reaction chamber where it is subjected to delayed coking.

Example 1

This example describes an embodiment of the invention in which gasification of the "SDA" fraction was used to produce hydrogen, which was then used in the hydrocracking of the DAO fraction. It will be understood that the $H_2$ may be supplied via other means.

A 1000 kg sample of crude oil was solvent deasphalted, using art known techniques, with butane solvents and adsorbents, in a reaction chamber, such as is depicted by "11" in FIG. 1. Prior to deasphalting, the crude oil was analyzed, and the results of this analysis are presented in the Table, column 1, which follows.

Following deasphalting, the asphalt fraction and deasphalted oil, or "DAO," were also analyzed, and these results are presented in columns 2 and 3 of the Table.

The asphalt fraction was gasified by oxygen and steam combining it into membrane wall reactor or gasification chamber, depicted at "15" in FIG. 1. The mixture was heated to 1045° C., with a water to carbon ratio of 0.6 (in terms of weight), and an oxygen:pitch ratio of 1.0.

After gasification was completed, the raw syngas product was combined with steam that was produced by either a boiler or process heat exchanger to a water gas shift ("WGS") reactor, which was operated at 318° C., one bar of pressure, and a water to hydrogen ratio of 3. This increased hydrogen yield.

All analyses and results are presented in the table which follows and which is elaborated upon infra:

TABLE 1

Summary of Components

| | | Column # | | | | | | | |
|---|---|---|---|---|---|---|---|---|---|
| | | 1 | 2 | 3 | 4 | 5 | 6 | 7 | 8 |
| Stream Name | | Arab Heavy CO | Deasphalted Crude Oil | Asphalt | C1-C4 | Upgraded Crude Oil | Oxygen | Steam | Hydrogen |
| Feedrate | kg | 1000 | 922 | 78 | 4.8 | 930 | 78 | 46.8 | 13 |
| Density | Kg/Lt | 0.8904 | 0.876 | 1.210 | | 0.825 | | | |
| API Gravity | * | 27.4 | 30.0 | −14.6 | | 40.1 | | | |
| Carbon | W % | 84.8233 | 85.04 | 78.36 | | | | | |
| Hydrogen | W % | 12.18 | 12.83 | 6.43 | | | | | |
| Sulfur | W % | 2.837 | 1.99 | 10.79 | | <20 | | | |
| Nitrogen | ppmw | 1670 | 535 | 9575 | | <20 | | | |
| MCR | W % | 8.2 | 2.55 | 61.3 | | | | | |
| Nickel | ppmw | 16.4 | 1 | 582 | | <1 | | | |
| Vanadium | ppmw | 56.4 | 1 | 172 | | <1 | | | |
| C5-Asphaltenes | W % | 7.8 | | | | | | | |
| C7-Asphaltenes | W % | 4.2 | | | | | | | |
| Toluene insolubles | W % | 0.0008 | | | | | | | |
| Ashes | W % | 0.014 | | | | | | | |
| H2 | W % | | | | | | | | 99.5 |
| H2S | W % | | | | | 2.47 | | | |
| NH3 | W % | | | | | 0.11 | | | |
| C1-C4 | W % | | | | 100 | | | | |
| 36-190 | W % | 17.4 | 20.6 | | | 21.5 | | | |
| 190-370 | W % | 25.8 | 29.0 | | | 36.0 | | | |
| 370-490 | W % | 17.9 | 19.1 | | | 21.2 | | | |
| 490+- | W % | 39.0 | 31.3 | | | 21.2 | | | |

While gasification was taking place, the DAO portion was introduced to a standard, hydrocracking unit, shown in "14," and hydrocracked at 360° C., 115 bars of hydrogen partial pressure, with an overall liquid hourly space velocity of 0.3 $h^{-1}$, with a Ni—Mo promoted, amorphous VGO hydrocracking catalyst and a zeolite catalyst designed for heavy oils, at a loading ratio of 3:1. See PCT/US11/46272, incorporated supra, for the catalyst used herein.

Also encompassed are compositions where catalysts are presented on a supper, such as an alumina, silica, or zeolite support. Exemplary zeolite supports have FAU, MOR, BEA, OR MFI topology. See, e.g., U.S. Pat. Nos. 3,875,290; 3,948,760; and 4,346,067, all of which are incorporated by reference.

The products which left the hydrocracking chamber were analyzed for content of low molecular weight hydrocarbons ($C_1$-$C_4$), upgraded crude oil, oxygen, steam, and hydrogen. These values are presented in columns 4-5 in Table 1. The upgraded crude oil was also analyzed for various minor components, as well as boiling fractions, in the same way the crude oil, and DAO were analyzed. To elaborate upon Table 1, Column 1 presents the analysis of the crude oil ("CO") used in the reaction. Column 2 is the analysis of the resulting DAO and Column 3, the asphalt fraction. Column 4 presents the information on the gas produced in the hydrocracking step, with Column 5, the upgraded crude oil. Finally, Columns 6, 7, and 8 refer to the reactants added to the reactors, as discussed supra.

Example 2

A 1000 kg sample of crude oil was solvent deasphalted using butane solvents and adsorbents, and techniques known to the art. Prior to this, the crude oil was analyzed, and the results are shown in column 1 of Table 2, which follows.

Following the deasphalting, both the asphalt fraction and the DAO were analyzed, and these results are also set forth in Table 2 as columns 2 and 3.

The DAO portion was introduced to a standard hydrocracking unit, and hydrocracked at 360° C., 115 bars hydrogen partial pressure, and an overall liquid hourly space velocity of 0.3 $h^{-1}$. As catalysts, a Ni—Mo promoted, amorphous VGO hydrocracking catalyst, and a zeolite catalyst designed for heavy oils were used, at a loading ratio of 3:1.

Products leaving the hydrocracking chamber were analyzed for each of: (i) low molecular weight hydrocarbons ($C_1$-$C_4$), upgraded crude oil, oxygen, steam and hydrogen. All values are presented in Table 2.

The resulting upgraded fuel oil was then fractionated, using standard techniques, to secure gas distillates, and unconverted DAO. The unconverted DAO was then transmitted to a delayed coking unit, and subjected to standard processes to secure anode grade coke, distillates, and gases. Again, values are given in Table 2.

| | | Stream# | | | | | | | | | |
|---|---|---|---|---|---|---|---|---|---|---|---|
| | | 1 | 2 | 3 | 4 | 5 | 6 | 7 | 8 | 9 | 10 |
| Stream Name | | Arab Heavy CO | Deasphalted Crude Oil | Asphalt | C1-C4 | Upgraded Crude Oil | Hydrogen | Uncoverted DAO | Anode Grade Coke | Gases | Distillates |
| Feedrate | kg | 1000 | 922 | 78 | 9.5 | 934 | 21 | 148 | 13 | 12 | 126 |
| Density | Kg/Lt | 0.8904 | 0.876 | 1.210 | | 0.811 | | | | | |
| API Gravity | — | 27.4 | 30.0 | −14.6 | | 43.0 | | | | | |
| Carbon | W % | 84.8233 | 85.04 | 78.36 | | | | | | | |
| Hydrogen | W % | 12.18 | 12.83 | 6.43 | | | | | | | |
| Sulfur | W % | 2.8297 | 1.99 | 10.79 | | <20 | | | <1 | | |
| Nitrogen | ppmw | 1670 | 535 | 9575 | | <20 | | | | | |
| MCR | W % | 8.2 | 2.55 | 61.3 | | | | | | | |
| Nickel | ppmw | 16.4 | 1 | 582 | | <1 | | | <1 | | |
| Vanadium | ppmw | 56.4 | 1 | 172 | | <1 | | | <1 | | |
| C5-Asphaltenes | W % | 7.8 | | | | | | | | | |
| C7-Asphaltenes | W % | 4.2 | | | | | | | | | |
| Toluene insolubles | W % | 0.0008 | | | | | | | | | |
| Ashes | W % | 0.014 | | | | | | | | | |
| Composition | W % | — | — | — | | | | | | | |
| H2 | Kg/h | 0.00 | 0.00 | 0.00 | 0.00 | 0.00 | 21.03 | 0.00 | | 0.00 | 0.00 |
| H2S | Kg/h | 0.00 | 0.00 | 0.00 | 0.00 | 23.01 | 0.00 | 0.00 | | 0.00 | 0.00 |
| NH3 | Kg/h | 0.00 | 0.00 | 0.00 | 0.00 | 1.01 | 0.00 | 0.00 | | 0.00 | 0.00 |
| C1-C4 | Kg/h | 0.00 | 0.00 | 0.00 | 9.47 | 0.00 | 0.00 | 0.00 | | 9.18 | 0.00 |
| 36-190 | Kg/h | 17.4 | 20.6 | 0.00 | 0.00 | 224.59 | 0.00 | 0.00 | | 0.00 | 18.72 |
| 190-370 | Kg/h | 25.8 | 29.0 | 0.00 | 0.00 | 371.80 | 0.00 | 0.00 | | 0.00 | 55.86 |
| 370-490 | Kg/h | 17.9 | 19.1 | 0.00 | 0.00 | 189.46 | 0.00 | 0.00 | | 0.00 | 51.40 |
| 490+- | Kg/h | 39.0 | 31.3 | 0.00 | 0.00 | 147.82 | 0.00 | 147.82 | | 0.00 | 125.98 |

The foregoing disclosure sets forth the features of the invention, which is a simplified methodology for delayed coking of hydrotreated and/or unconverted DAO fractions produced when eliminating impurities in hydrocarbon containing feedstocks, such as crude oil, which does not involve distillation. To summarize, the crude oil is solvent deasphalted, resulting in DAO and asphalt. The DAO is then hydrocracked in the presence of a catalyst so as to desulfurize and denitrogenize it, and to convert any hydrocarbons, which have a boiling point over 370° C. into distillates. Any hydrotreated or unconverted DAO fractions are then subjected to delayed coking. Concurrently, the asphalt fraction is gasified so as to produce hydrogen. In one embodiment, the hydrogen is channeled back into the hydrocracking reactor and used in that process. The nature of the gasification feedstock will, of course vary and may include ash in an amount ranging from about 2% to about 10% of the total feedstock. The feedstock may be liquid or solid. Liquid feedstocks having components with boiling points of from about 36° C. to about 2000° C. are preferred. The feedstock may be, e.g., crude oil bituminous, oil, sand, shale oil, coal, or a bio liquid.

In practice, it is desirable to subject the crude oil to a paraffinic solvent to separate DAO and asphalt. The solvent comprises one or more $C_3$-$C_7$ alkanes, which may be straight chained or branched. Preferably, the solvent comprises one or, most preferably, a mixture of butanes. Solvation takes place at temperatures and pressures, which are below the critical values for both of these.

It is especially preferred to carry out the deasphalting step, discussed, in the presence of a solid adsorbent, preferably added in an amount sufficient to provide a hydrocarbon: adsorbent ratio of from 20:0.1 to 10:1, expressed in terms of W/W.

After separation, the DAO is transmitted to a hydrocracking unit, where hydrocracking is carried out at conditions which may vary, but are preferably a pressure of from about 100 to about 200 bars, a temperature of from about 350° C. to about 450° C., an LHSV of from about 0.1 to about 4.0 h$^{-1}$, and a hydrogen:oil ratio of from about 500 to about 2500 SLt/Lt. Any standard hydrocracking system may be used including single reactors, multiple reactors operated in series, fixed bed reactors, ebullated bed reactors, and so forth.

A catalyst is used in the hydrocracking process, preferably the catalyst incorporated by reference supra. Preferably, the catalyst contains from about 2% to about 40% by weight of active metal, a total pore volume of from about 0.3 to about 1.5 cc/g, a total surface area of from about 200 to about 450 m$^2$/g, and an average pore diameter of at least 50 angstroms.

With respect to the active metal, referred to supra, metals from Group VI, VII or VIIIB are preferred, and may include one or more of Co, Ni, W, and Mo. While it is not required to do so, the catalysts are generally incorporated on a support, such as alumina, silica, a zeolite or a zeolite modified by, e.g., steam, ammonia, acid washing and/or insertion of transition metals into its structure. The zeolite, if used, may have FAU. MOR, BEA, or MFI topology.

Concurrent with the hydrocracking of the DAO and the delayed coking, the asphalt portion of the crude oil is gasified in a gasification chamber, e.g., a membrane wall type reactor, preferably at a temperature of from about 900° C. to about 1700° C., and a pressure of from about 20 bars to about 100 bars. Gasification takes place in the presence of an O$_2$ containing gas, which may be, e.g., pure O$_2$ or more preferably, air. Means may be provided to control the amounts of asphalt and oxygen entering the gasification reactor. Such means are well known to the skilled artisan and need not reiterated here. It is preferred to control the amounts of asphalt and O$_2$, so that a stoichiometric balance permitting partial combustion ensues. This can be determined via determining the hydrocarbon content of the crude oil, such as was done in the example, supra. Preferably, the amounts are selected such that the oxygen:carbon ratio ranges from about 0.2:1.0 to about 5:0.1 by weight. Any coke produced in the delayed coking step discussed above may be gasified to produce hydrogen.

Optionally, steam may be added to the gasification chamber. When it is, it too is added in an amount based upon the carbon content of the crude oil, and is preferably presented at a ratio of from about 0.1:1.0 to about 100:1.0 by weight. Gasification results in a product sometimes referred to as "syngas" consisting essentially of hydrogen and carbon monoxide. In one embodiment of the invention, the syngas produced by gasification is transmitted to a water gas shift reaction chamber and treated to produce H$_2$ and CO$_2$, after which H$_2$ is separated. The resulting, pure H$_2$ may be channeled to the hydrocracking reaction.

The process by which the syngas is treated may include treatment at a temperature of from about 150° C. to about 400° C., and a pressure of from about 1 to about 60 bars.

As was seen, supra, gas content can be measured at any point in the process described here. Hence, following measurement of CO content in the syngas, water can be added to the reaction chamber, preferably at a molar ratio with CO of from about 3:1 to about 5:1.

Other facets of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A method for producing anode grade coke, comprising:
   solvent deasphalting a hydrocarbon feedstock to produce an asphalt fraction and a deasphalted oil (DAO) fraction, in a first reaction chamber;
   processing said DAO fraction and asphalt fraction in separate, second, third, and fourth reaction chambers;
   (iii) hydrocracking said DAO fraction in said second reaction chamber in the presence of a catalyst, which contains from 2-40 wt % active metal, a pore volume of from 0.33-1.50 cc/gm, a surface area of 250-450 m$^2$/g, and an average pore diameter of at least 50 Angstroms to remove sulfur and nitrogen therefrom and to distill any hydrocarbons contained in said DAO fraction which have a boiling point over 370° C.;
   (iv) subjecting any hydrotreated or unconverted DAO fraction to delayed coking in a third chamber, and
   (v) gasifying said asphalt fraction via combining it with oxygen and steam, in said fourth reaction chamber, to produce hydrogen therefrom.

2. The method of claim 1, further comprising gasifying any coke produced in step (iv).

3. The method of claim 1, comprising introducing and hydrogen produced in said third reaction chamber into said second reaction chamber.

4. The method of claim 1, wherein said hydrocarbon feedstock is crude oil and said solvent deasphalting comprises mixing said crude oil with a paraffinic solvent containing C$_3$-C$_7$ carbon atoms, at a temperature and a pressure below critical temperature and critical pressure of said solvent.

5. The method of claim 4, wherein said solvent comprises n-butane and isobutane.

6. The method of claim 4, further comprising contacting said crude oil with a solid adsorbent.

7. The method of claim 4, wherein said solvent comprises a mixture of butanes.

8. The method of claim 4, wherein said crude oil and solvent are combined at a weight ratio of from 10:1 to 200:1 w/w.

9. The method of claim 1, comprising hydrocracking said DAO in a series of multiple chambers.

10. The method of claim 1, wherein said second reaction chamber is a hydrocracking chamber and is a fixed bed, ebullated bed, or slurry bed chamber.

11. The method of claim 1, wherein said active metal is a Group VI, VII, or VIIIB metal.

12. The method of claim 1, wherein said active metal comprises Co, Ni, W, or Mo.

13. The method of claim 1, wherein said catalyst is presented on a support.

14. The method of claim 13, wherein said support comprises alumina, silica, or a zeolite.

15. The method of claim 14, wherein said support is a zeolite with FAU, MOR, BEA or MFI topology.

16. The method of claim 15, wherein said zeolite has been modified by treatment with at least one of steam, ammonia, or acid, and contains at least one transition metal.

17. The method of claim 16, wherein said at least one transition metal is Zn or Ti.

18. The method of claim 1, comprising gasifying said asphalt fraction at a temperature of from 900° C. to 1700° C., a pressure of from 20 bars to 100 bars, and an $O_2$ containing gas.

19. The method of claim 18, wherein said $O_2$ containing gas is pure $O_2$, air, or steam.

20. The method of claim 18, comprising adjusting the amount of said asphalt fraction and said oxygen containing gas to provide a stoichiometric balance therebetween which results in partial combustion of said asphalt.

21. The method of claim 18, wherein said $O_2$ from said $O_2$ containing gas and carbon from said asphalt fraction are present at a ratio of from 0.2:1.0 to 10:0.2 by weight.

22. The method of claim 19, wherein said $O_2$ containing gas is steam, said method further comprising introducing said asphalt fraction and steam to said fourth reaction chamber at a ratio of from 0.1 to 1.0 to 10:0.1, based upon weight of carbon in said feedstock, wherein said feedstock is crude oil.

\* \* \* \* \*